United States Patent [19]

Baker

[11] 4,075,422

[45] Feb. 21, 1978

[54] AUTOMATIC PAGE SELECTORS

[75] Inventor: Henry Louis Baker, Northwood, England

[73] Assignee: Communications Patents Limited, London, England

[21] Appl. No.: 697,027

[22] Filed: June 17, 1976

[30] Foreign Application Priority Data

June 21, 1975   United Kingdom ............... 26480/75

[51] Int. Cl.² .............................................. G06F 3/14
[52] U.S. Cl. ................................... 178/23 R; 178/30; 340/324 AD; 358/185
[58] Field of Search ............... 178/DIG. 30, 23 R, 30, 178/15; 340/324 AD, 172.5; 358/185

[56]                References Cited

U.S. PATENT DOCUMENTS 3,242,470   3/1966   Hagelbarger et al. ............ 340/172.5
3,396,377   8/1968   Strout ........................... 340/324 AD
3,996,583   12/1976  Hutt et al. ..................... 340/324 AD

OTHER PUBLICATIONS

*Wireless World Teletext Decoder;* by Daniels; Wireless World, Dec. 1975, pp. 563–566.

*Primary Examiner*—Thomas A. Robinson
*Attorney, Agent, or Firm*—Laurence R. Brown

[57]            ABSTRACT

An automatic page selector comprises a counter, a page selector device responsive to the output of the counter to select pages for decoding and display, and a clock for providing pulses to the counter. Means may be provided for writing data into a memory the locations of which are sequentially addressable by the counter, and for controlling the intervals between successive clock pulses applied to the counter in accordance with the written data.

5 Claims, 4 Drawing Figures

AUTOMATIC PAGE SELECTORS

The present invention relates to automatic page selectors.

Teletext receiving units are known which are provided with a manual page selector, but there is a need for an automatic page selector which could for example control a decoder to reproduce teletext page by page as an additional programme on a broadcasting system. Such a selector could be installed for example to provide a programme to a number of subscribers on a wired broadcasting system.

According to the present invention, there is provided a page selector comprising a counter, a page selector device responsive to the output of the counter to select pages for decoding and display, and a clock for providing pulses to the counter.

The selector preferably also comprises a memory, the locations of which are sequentially addressable by the counter, means for writing data into the memory, and means for controlling the intervals between successive clock pulses applied to the counter in accordance with the written data. Manual switches may be provided for addressing selected locations of the memory, and means provided for writing information in the selected locations.

The counter may be for example a two digit binary coded decimal counter. The clock may provide pulses separated by intervals long enough to enable a page of teletext to be read. Such an arrangement would enable sequential selection of pages from 00 to 99. A further three bit counter could be provided to select the programme channel and/or magazine from which the page selection is taken.

A comparator and an associated manual binary coded decimal switch could also be provided, the comparator comparing the counter output with a manually set switch output and restarting the selection sequence when the outputs become the same. Thus pages 00 to $xy$ could be selected, where $xy$ is the manual switch setting. Alternatively, a preloadable counter could be utilized with an associated manual binary coded decimal switch to permit sequential selection from $ab$ to 99 where $ab$ is the preloaded switch setting. Further, the comparator and its associated manual binary coded decimal switch could be in combination with the preloadable counter and its associated manual binary coded decimal switch to permit sequential selection from pages $ab$ to $xy$.

Embodiments of the present invention will now be described, by way of example, with reference to the accompanying drawings, in which.

Figure 1:
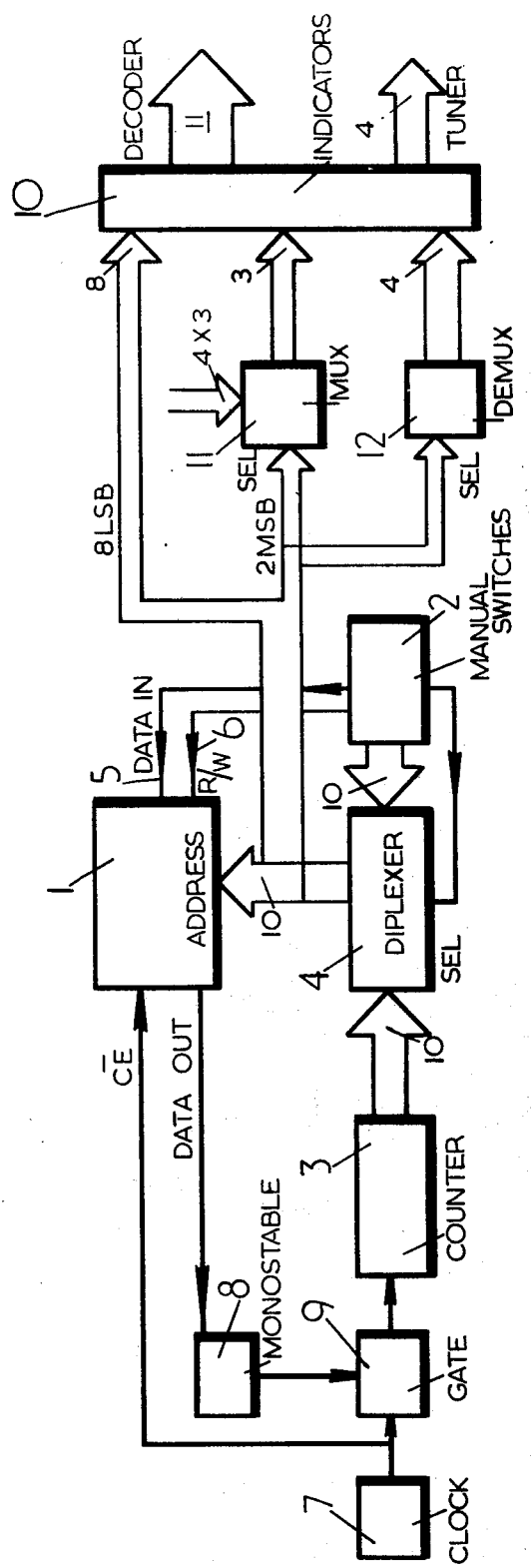
FIG. 1 is a schematic block diagram of a selector capable of sequentially selecting for decoding any of up to one hundred pages of teletext provided on each of four channels.

Referring to FIG. 1 a selector is shown which comprises a random access memory 1 having a 1024 × 1 bit capacity the inputs to which are controlled by a manual switch arrangement 2. The memory may be addressed with a 10 bit address code provided either by three binary coded decimal (BCD) switches (not shown) in arrangement 2 or by a counter 3, the outputs of arrangement 2 and counter 3 being selectively applied to the memory 1 by a diplexer 4. The diplexer 4, the output of which is applied to page and channel selection devices which will be described hereinafter, as well as to the memory 1, is controlled by the arrangement 2.

In operation, the arrangement 2 is set so that a logic "0" signal is applied to the memory "data in" input 5, a "write" signal is applied to the memory "read/write" input 6, and the output of the counter 3 is applied by the diplexer 4 to the memory. The counter 3 is clocked at high speed by pulses from a clock 7, and thus "0" is written into every location in the memory 1.

The selector is then programmed by setting the arrangement 2 so that its address output is applied to the memory 1 by the diplexer 4, and thereafter writing in logic "1" at each memory location which corresponds with a page of teletext which is desired. This is done by setting the BCD switches to the number corresponding with each required page and channel in turn, the two most significant bits (MSB) identifying the channel and the eight least significant bits (LSB) identifying the page.

After programming, the selector may be arranged to control automatically the selection of page and channel by setting the switch arrangement 2 so that the memory 1 is again addressed by the counter 3. As each memory location is addressed in turn its contents is read. If a "1" is read, a monostable 8 is triggered which disables a gate 9 for a predetermined time, thereby stopping clock pulses reaching the counter 3. The predetermined time is selected to be sufficient to allow a selected page to be read. If a "0" is read, the monostable 8 is not triggered and the next location in the memory 1 is addressed and read.

As stated above, the diplexer 2 provides an address signal to both the memory 1 and page and channel selection devices. The 8 LSB drive two numeric page indicators (not shown) in a series of indicators 10 and a decoder (not shown) which selects the desired page. The 2 MSB are applied to a triple four line to one line multiplexer 11 and to a one line to four line demultiplexer 12. The four outputs of the demultiplexer 12 are arranged to light respective light emitting diode channel indicators (not shown) in indicator series 10 and to apply an appropriate D.C. potential to varactors of a UHF receiver tuner (not shown) to select the desired channel. The multiplexer 11 has four sets of three bit inputs that are provided either by hard wiring or pre-set switches, each input designating a respective magazine. The 2 MSB input to the multiplexer 11 selects a desired one of these four sets of three bits. The output of multiplexer 11 drives a third numeric page indicator (not shown) in indicator series 10 and the decoder which selects the desired magazine.

Figure 2:
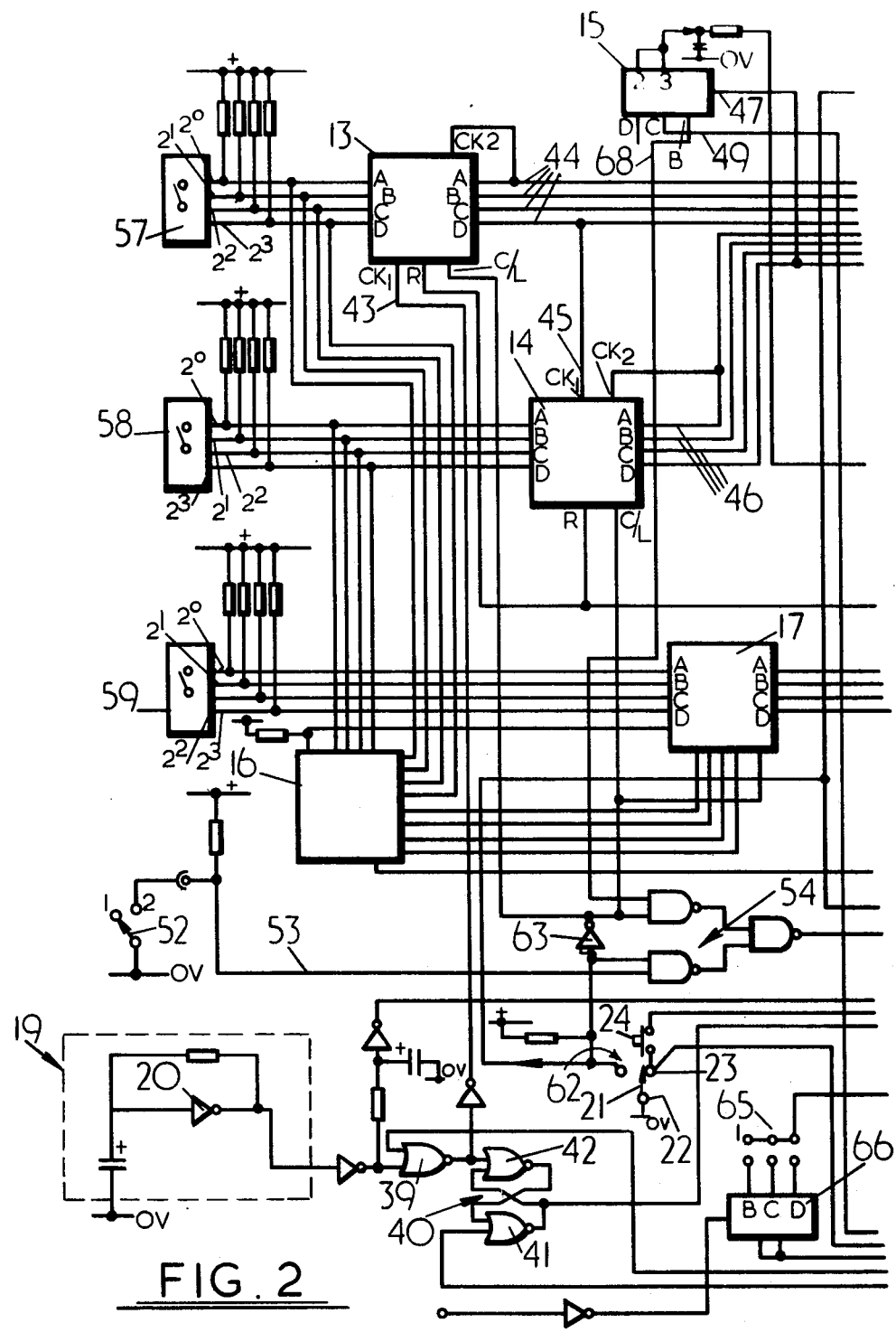
FIGS. 2 and 3 are respectively left and right hand portions of a detailed block circuit diagram of a selector capable of sequentially selecting for decoding any of up to one hundred pages of teletext provided on each of two channels.
Figure 3:
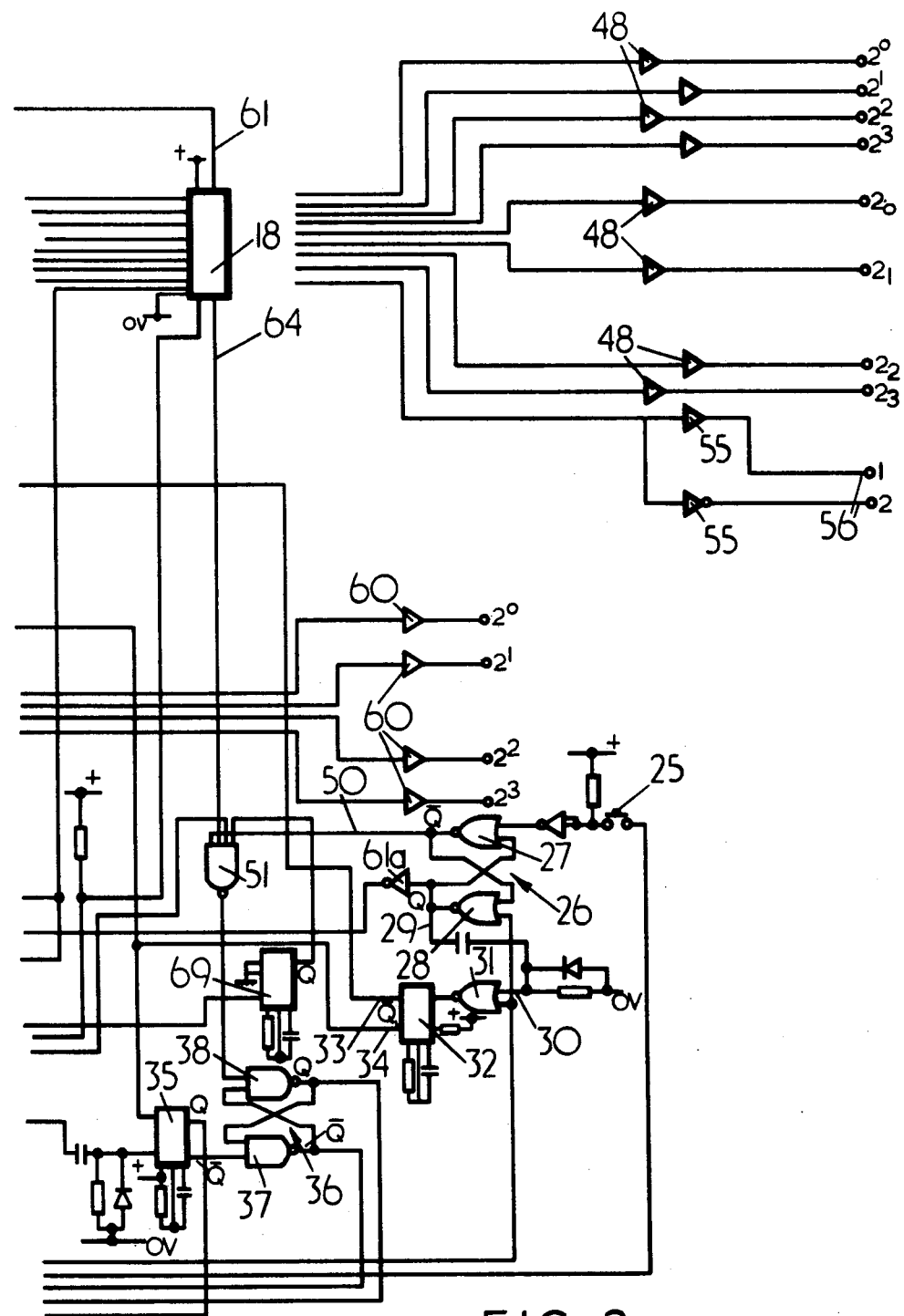

Referring to FIGS. 2 and 3 which should be viewed together, a specific embodiment of the present invention will be described which enables the selection of pages of a magazine from two television channels in turn.

The embodiment of FIGS. 2 and 3 comprises a 10-bit counter formed by four-bit counter elements 13 and 14 and two-bit counter element 15, diplexers 16 and 17, a 1024 × 1 bit random access memory 18, and a clock pulse generator 19 including a Schmitt trigger 20.

In operation, when it is desired to programme a particular page and magazine selection, any memory content is erased and the logic circuitry is reset by moving a switch 21 to connect terminals 22, 23 and closing "write" switch 24 and "erase" switch 25. This results in a bistable latch 26 formed by coupled NOR gates 27, 28 changing its state to the "set" condition. When the latch 26 is set, a pulse is applied via conductor 29 to a terminal 30 of a NOR gate 31, and the gate 31 triggers a monostable 32 which provides a reset pulse on conductor 33 to counter 15, and a pulse on conductor 34 which triggers a monostable 35 and resets counters 13 and 14. The 10-bit counter formed by elements 13, 14 and 15 is thus set to zero. With the latch 26 set the data input signed 61 to memory 18 is changed to "0" via inverter 61a.

When the monstable 35 is triggered, its output causes a bistable circuit 36 formed by NAND gates 37 and 38 to change its state. This change of state results in NOR gate 39 opening to pass clock pulses from generator 19, and in a change of state for a bistable circuit 40 formed by NOR gates 41 and 42.

The clock pulses are applied to clock input 43 of counter element 13 which provides binary coded decimal outputs 44, the tenth pulse causing the "binary 1" signal on the fourth output 44 to disappear as counting of the next ten pulses commences. The signal on the fourth output 44 is applied to clock input 45 of counter 14 which also provides binary coded decimal outputs 46. The signal on the fourth output of the counter element 14 is applied to input 47 of counter element 15. The counter elements 13, 14 and 15 thus respectively count units, tens and hundreds. The outputs of the counter elements 13 and 14 are applied to the first eight address inputs of the memory 18 and also to a page selector decoder (not shown) via buffers 48.

As the counter counts the clock pulses, it addresses 200 locations of the memory 18 in turn. With the switches 21 and 24 arranged as described above for programming a selection, and latch 26 set a logic "0" is written into each location addressed. On the 201st impulse a pulse is applied to conductor 49 by counter element 15 which resets the latch circuit 26. As a result a pulse is applied via conductor 50 and NAND gate 51 to the bistable circuit 36 which in turn closes the clock pulse gate 39, cutting off clock pulses from the counter. The switches 24 and 25 are then opened, and the circuitry is then ready for the programming of a selection. With latch 26 reset the data input signal 61 to the memory 18 is a "1".

The first operation is programming a selection is the setting of a switch 52 to the "channel 1" position shown. As a result, a positive voltage is applied via conductor 53 to a diplexer 54 formed by three NAND gates. The diplexer 54 provides a ninth address bit input to the memory 18 and controls the tuning of a television receiver (not shown) through buffers 55 and terminals 56, and the receiver is accordingly tuned to receive the broadcast on channel 1.

Two binary coded decimal switches 57 and 58 are then set to select the page number, switch 57 controlling units and switch 58 controlling tens, and a binary coded decimal switch 59 is set to select a magazine on channel 1 from which it is desired to reproduce the selected pages.

The settings of switches 57 and 58 are loaded into the counter elements 13 and 14 respectively, the counter elements providing corresponding outputs to the memory 18 and to the page selector decoder (not shown) via the buffers 48. The magazine selection signals pass from switch 59 via diplexer 17 and buffers 60 to a magazine selector decoder (not shown).

Each time a location in the memory 18 is addressed by the switches 57, 58 and 59, the logic "1" data input signal 61 can be written into that location by momentarily closing "write" switch 24. A total of one hundred page selections can be made in any order from the selected magazine of channel 1. Thereafter, the switch 52 may be switched to channel 2, the switch 59 set to the desired magazine, and a further one hundred page selections made using the switches 57 and 58 and the "write" switch 24.

When programming has been completed, switch 21 is set to connect terminals 22 and 62, and switches 57 and 58 are set to the programmed magazine on channels 1 and 2 respectively. Switch 59 is not used. Circuit 63 switches diplexer 54 to transmit bit 1 of counter element 15 to address bit 9 of memory 18 and to switch diplexer 17 to transmit the output of diplexer 16 to the magazine selector decoder (not shown).

Clock pulses are now counted by the counter elements 13, 14 and 15, the outputs of which address the locations of the memory 18 in sequence. If a logic "0" has been written at the first location, the memory is very rapidly clocked to the next sequential address. If however, an addressed location contains a "1", the memory output 64 sets the bistable 36 via gate 51 to inhibit the clock pulse gate 39. The counter output thus remains constant and is passed to the page and channel selector in the decoder and receiver thus causing the selected page to be displayed. This state is maintained for a predetermined number of magazine cycles as selected by a link 65 in the output of a counter 66.

The input to the counter 66 is derived from a "page correct" signal applied to terminal 67 from the decoder (not shown). At the end of the required display period (usually about 1 minute) the output of the counter 66 triggers monostable 35 which in turn resets the bistable 36. The gate 39 thus again passes clock pulses to the counter which counts the pulses until another location in the memory in which a logic "1" is written is reached.

After every one hundred clock pulses the "B" output 68 of counter 15 changes which causes the diplexer 54 to change the output of the channel selector buffers 55 and the output of the diplexer 16 to correspond with the setting of the switches 57 and 58 alternatively.

A circuit 69 always receives the output of the clock pulse generator 19 and controls the gate 51, so as to prevent setting of the bistable 36 in the absence of clock pulses. The gate 51 also receives an input from bistable 40 which prevents setting of the bistable 36, unless the gate 39 is passing the clock pulses to the counter.

As indicated in FIG. 2, a number of conventional pulse-shaping circuits are provided to ensure reliable operation of the logic circuits.

It will be appreciated that the illustrated circuit enables pre-programmed pages to be displayed in numerical sequence from two channels in turn.

It will be appreciated that in both of the illustrated arrangements there is no provision for making a magazine selection independently of the channel selection as both selections are controlled by the same data and therefore there is only one magazine available for each channel selection. The three bit magazine selection signal does however differ from channel to channel and may be varied from time to time if desired. This provides flexibility as if for example in the arrangement of FIG. 2, two magazines were made available on one broadcast channel, the channel selection could be made static.

Figure 4:
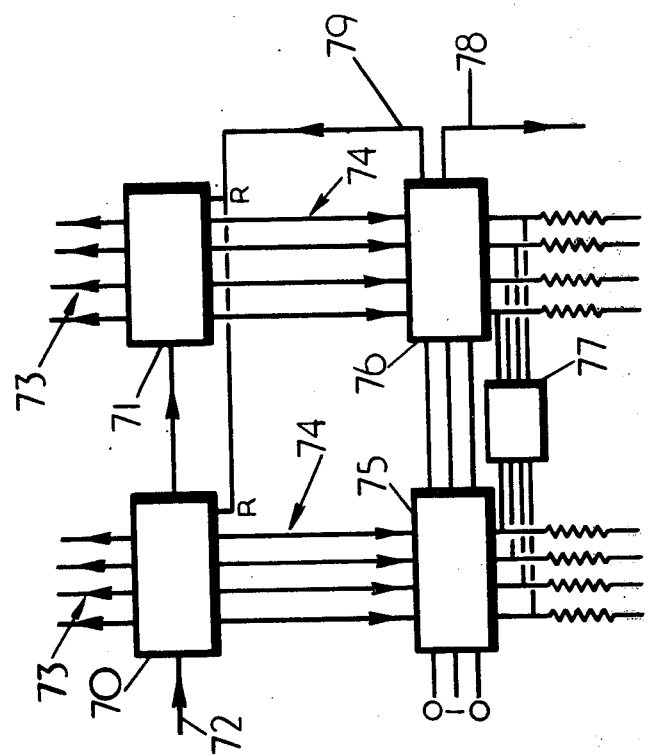
FIG. 4 illustrates a further embodiment.

Referring to FIG. 4, a further embodiment of the invention is illustrated which comprises a counter formed by two four bit counter elements 70, 71. The counter receives clock pulses on input 72 and provides outputs 73 to a page selector decoder (not shown) and outputs 24 to a comparator formed by comparator elements 75 and 76. The comparator elements 75 and 76 receive inputs from an associated, manual binary coded decimal switch 77.

If it is desired to sequentially select pages 00 to XY, the number XY is set in the manual switch 77. The counter counts the clock pulses and controls the decoder accordingly. The comparator compares the outputs from the counter and from the switch 77 and provides an output 78 when the counter output reaches XY. The output 78 may be used for a variety of purposes such as to provide an indication of the number of magazine cycles completed. As soon as the counter outputs indicate a count greater than XY, an output 79 resets the counter elements 70 and 71 and a fresh selection sequence can then be made.

What is claimed is:

1. A page selector comprising a counter, a page selector device responsive to the output of the counter to select pages for decoding and display, a clock for providing pulses to the counter, a memory the locations of which are sequentially addressable by the counter, means for writing data into the memory, means for controlling the intervals between successive clock pulses applied to the counter in accordance with the written data, manual switches for addressing selected locations of the memory, means for writing information in the selected locations wherein the counter output is connected permanently to the memory and is connected to receive inputs from the manual switches, and wherein the counter comprises first, second and third counter elements and the manual switches comprise first and second switches connected respectively to the first and second counter elements and to separate inputs of a first diplexer, a second diplexer being connected to apply the output of a third switch or the output of the first diplexer to a magazine selector device, and a gate being connected to apply the clock pulses to the first counter element.

2. A page selector according to claim 1 comprising means for inhibiting the gate.

3. A page selector according to claim 2, wherein the gate inhibiting means comprises a bistable circuit which may be set by an output from the memory, indicative of an addressed memory location identifying a page which is to be selected.

4. A page selector according to claim 3, wherein the bistable circuit may be reset by an output from a further counter.

5. A page selector according to claim 3, comprising a latch circuit for setting the bistable circuit and resetting the first and second counter elements to zero.

* * * * *